US006487661B2

United States Patent
Vanstone et al.

(10) Patent No.: US 6,487,661 B2
(45) Date of Patent: *Nov. 26, 2002

(54) KEY AGREEMENT AND TRANSPORT PROTOCOL

(75) Inventors: Scott A. Vanstone, Waterloo (CA); Alfred John Menezes, Auburn, AL (US); Mingua Qu, Waterloo (CA)

(73) Assignee: Certicom Corp., Mississauga (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/426,090

(22) Filed: Apr. 21, 1995

(65) Prior Publication Data

US 2001/0042205 A1 Nov. 15, 2001

(51) Int. Cl.⁷ .................................................. H04L 9/00
(52) U.S. Cl. ........................ 713/171; 713/169; 380/278; 380/285; 380/30
(58) Field of Search ............................. 380/21, 49, 30, 380/23, 25, 44, 277, 278, 282; 713/169, 171

(56) References Cited

FOREIGN PATENT DOCUMENTS

| EP | 0393806 | 10/1990 | ............. H04L/9/32 |
| EP | 0639907 | 2/1995 | ............. H04L/9/32 |

OTHER PUBLICATIONS

Whitfield Diffie . . . Et Al, "Authentication and Key Exchanges," Designs, Codes and Cryptography, 2, pp 107–125 (1992).*

Boyd, Design and Analysis of Key Exchange Protocols via Secure Channel Identification, Advances in Cryptology—4th Int'l Conf., pp. 171–181 (Nov. 1994).

Matsumoto, On Seeking Smart Public Key Distribution Systems, Trans. IECE of Japan, vol. E69, No. 2, pp. 99–106 (Feb. 1986).

* cited by examiner

*Primary Examiner*—Gail Hayes
*Assistant Examiner*—James Seal
(74) *Attorney, Agent, or Firm*—The Maxham Firm

(57) ABSTRACT

A key establishment protocol includes the generation of a value of cryptographic function, typically a hash, of a session key and public information. This value is transferred between correspondents together with the information necessary to generate the session key. Provided the session key has not been compromised, the value of the cryptographic function will be the same at each of the correspondents. The value of the cryptographic function cannot be compromised or modified without access to the session key.

16 Claims, 3 Drawing Sheets

KEY AGREEMENT AND TRANSPORT PROTOCOL

BACKGROUND

1. Field of the Invention

The present invention relates to key agreement protocols for transfer and authentication of encryption key.

2. Discussion of the Prior Art

To retain privacy during the exchange of information it is well known to encrypt data using a key. The key must be chosen so that the correspondents are able to encrypt and decrypt messages but such that an interceptor cannot determine the contents of the message.

In a secret key cryptographic protocol, the correspondents share a common key that in secret to them. This requires the key to be agreed upon between the correspondents and for provision to be made to maintain the secrecy of the key and provide for change of the key should the underlying security be compromised.

Public key cryptographic protocols were first proposed in 1976 by Diffie-Hellman and utilized a public key made available to all potential correspondents and a private key known only to the intended recipients. The public and private keys are related such that a message encrypted with the public key of a recipient can be readily decrypted with the private key but the private key cannot be derived from the knowledge of the plaintext, ciphertext and public key.

Key establishment is the process by which two (or more) parties establish a shared secret key, called the session key. The session key is subsequently used to achieve some cryptographic goal, such an privacy. There are two kinds of key agreement protocol; key transport, protocols in which a key is created by one party and securely transmitted to the second party; and key agreement protocols, in which both parties contribute information which jointly establish the shared secret key. The number of message exchanges required between the parties is called the number of passes. A key establishment protocol is said to provide implicit key authentication (or simply key authentication) if one party is assured that no other party aside from a specially identified second party may learn the value of the session key. The property of implicit key authentication does not necessarily mean that the second party actually possesses the session key. A key establishment protocol is said to provide key confirmation if one party is assured that a specially identified second party actually has possession of a particular session key. If the authentication is provided to both parties involved in the protocol, then the key authentication is said to be mutual if provided to only one party, the authentication is said to be unilateral.

There are various prior proposals which claim to provide implicit key authentication.

Examples include the Nyberg-Rueppel one-pass protocol and the Matsumoto-Takashima-Imai (MTI) and the Goss and Yacobi two-pass protocols for key agreement.

The prior proposals ensure that transmissions between correspondents to establish a common key are secure and that an interloper cannot retrieve the session key and decrypt the ciphertext. In this way security for sensitive transactions such as transfer of funds is provided.

For example, the MTI/A0 key agreement protocol establishes a shared secret K, known to the two correspondents, in the following manner:

1. During initial, one-time setup, key generation and publication is undertaken by selecting and publishing an appropriate system prime p and generator $\alpha \epsilon Z_p^*$ in a manner guaranteeing authenticity. Correspondent A selects as a long-term private key a random integer "a", $1 \leq a \leq p-2$, and computes a long-term public key $p_A = \alpha^a$ mod p. Correspondent B generates analogous keys b, $p_b$. Correspondent A and B have access to authenticated copies of each other's long-term public key.

2. The protocol requires the exchange of the following messages.

$$A \rightarrow B: \alpha^x \bmod p \quad (1)$$

$$A \leftarrow B: \alpha^y \bmod p \quad (2)$$

The values of x and y which are random integers selected by correspondent A and correspondent B respectively remain secure during such transmissions as it is impractical to determine the exponent even when the value of the generator α and the exponentiation is known provided of course that the system prime p is chosen sufficiently large.

3. To implement the protocol the following steps are performed each time a shared key is required between correspondents A and B.

(a) A chooses a random integer x, $1 \leq x \leq p-2$, and sends B message (1) i.e. $\alpha^x$ mod p.
 (b) B chooses a random integer y, $1 \leq y \leq p-2$, and sends A message (2) i.e. $\alpha^y$ mod p.
 (c) A computes the key $K=(\alpha^y)^a z_B^x$ mod p.
 (d) B computes the key $K=(\alpha^x)^b z_A^y$ mod p.
 (e) Both share the key $K=\alpha^{bx+ay}$.

In order to compute the key K, A must use his secret key a and the random integer x, both of which are known only to him. Similarly B must use her secret key b and random integer y to compute the session key K. Provided the secret keys a,b remain uncompromised, an interloper cannot generate a session key identical to the other correspondent. Accordingly, any ciphertext will not be decipherable by both correspondents.

As such this and related protocols have been considered satisfactory for key establishment and resistant to conventional eavesdropping or man-in-the-middle attacks.

In some circumstances it may be advantageous for an adversary to mislead one correspondent as to the true identity of the other correspondent.

In such an attack an active adversary or interloper E modifies messages exchanged between correspondents A and B, with the result that B believes that he shares a key K with E while A believes that she shares the same key K with B. Even though E does not learn the value of K the misinformation as to the identity of the correspondents may be useful.

A practical scenario where such an attack may be launched successfully is the following. Suppose that B in a bank branch and A is an account holder. Certificates are issued by the bank headquarters and within the certificate is the account information of the holder. Suppose that the protocol for electronic deposit of funds is to exchange a key with a bank branch via a mutually authenticated key agreement. Once B has authenticated the transmitting entity, encrypted funds are deposited to the account number in the certificate. If no further authentication is done in the encrypted deposit message (which might be the case to save bandwidth) then the deposit will be made to E's account.

SUMMARY OF INVENTION

It is therefore an object of the present invention to provide a protocol in which the above disadvantages are obviated or mitigated.

According therefore to the present invention there is provided a method of authenticating a pair of correspondents A,B to permit exchange of information therebetween, each of said correspondents having a respective private key a,b and a public key $p_A, p_B$ derived from a generator $\alpha$ and respective ones of said private keys a,b, said method including the steps of i) a first of said correspondents A selecting a first random integer x and exponentiating a function $f(\alpha)$ including said generator to a power $g^{oo}$ to provide a first exponentiated function $f(\alpha)^{g^{oo}}$;

ii) said first correspondent A forwarding to a second correspondent B a message including said first exponentiated function $f(\alpha)^{g^{oo}}$;

iii) said correspondent B selecting a second random integer y and exponentiating a function $f'(\alpha)$ including said generator to a power $g^{oo}$ to provide a second exponentiated function $f'(\alpha)^{g^{oo}}$;

iv) said second correspondent B constructing a session key K from information made public by said first correspondent A and information that is private to said second correspondent B, said session key also being constructible by said first correspondent A for information made public by B and information that is private to said first correspondent A;

v) said second correspondent B generating a value h of a function $F[\pi,K]$ where $F[\pi,K]$ denotes a cryptographic function applied conjointly to $\pi$ and K and where $\pi$ is a subset of the public information provided by B thereby to bind the values of $\pi$ and K;

vi) said second of said correspondents B forwarding a message to said first correspondent A including said second exponential function $f'(\alpha)^{g^{oo}}$ and said value h of said cryptographic function $F[\pi,K]$;

vii) said first correspondent receiving said message and computing a session key K' from information made public by said second correspondent B and private to said first correspondent A;

viii) said first correspondent A computing a value h' of a cryptographic function h,h' $F[\pi,K']$; and ix) comparing said values obtained from said cryptographic functions F to confirm their correspondence.

As the session key K can only be generated using information that is private to either A or B, the binding of K with $\pi$ with the cryptographic function h prevents E from extracting K or interjecting a new value function that will correspond to that obtained by A.

BRIEF DESCRIPTION OF THE FIGURES

Embodiments of the invention will now be described by way of example only with reference to the accompanying drawings in which.

DETAILED DESCRIPTION OF DRAWINGS

Figure 1:
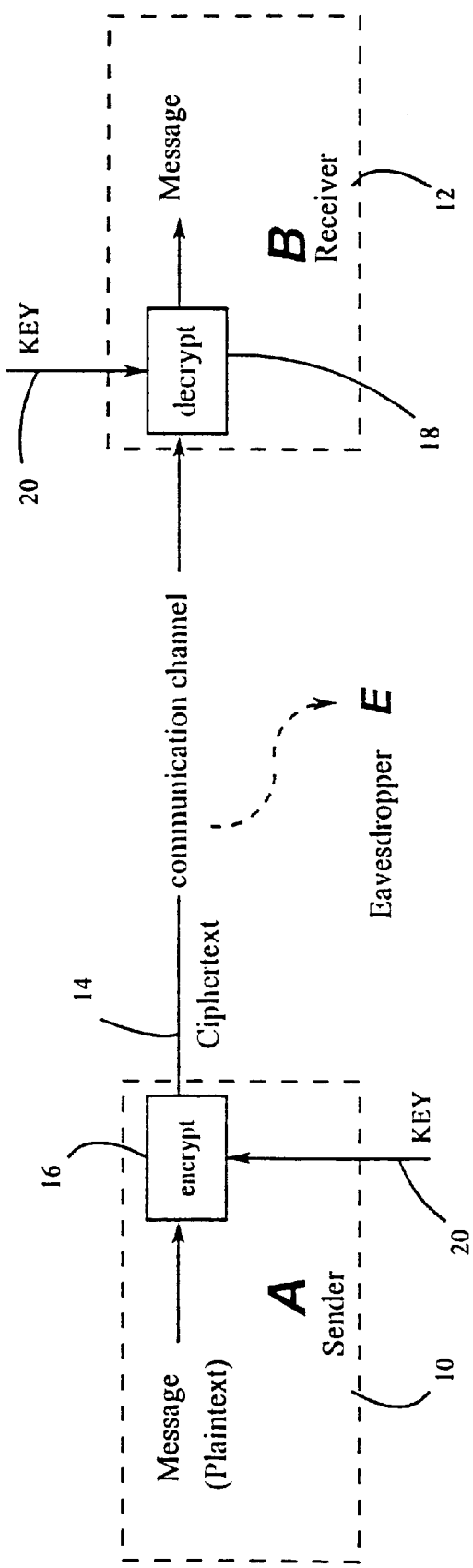
FIG. 1 in a schematic representation of a data communication system.

Referring therefore to FIG. 1, a pair of correspondents, 10,12, denoted as correspondent A and correspondent B, exchange information over a communication channel 14. A cryptographic unit 16,18 is interposed between each of the correspondents 10,12 and the channel 14. A key 20 is associated with each of the cryptographic units 16,18 to convert plaintext carried between each unit 16,18 and its respective correspondent 10,12 into ciphertext carried on the channel 14.

In operation, a message generated by correspondent A, 10, is encrypted by the unit 16 with the key 20 and transmitted as ciphertext over channel 14 to the unit 18.

The key 20 operates upon the ciphertext in the unit 18 to generate a plaintext message for the correspondent B, 12. Provided the keys 20 correspond, the message received by the correspondent 12 will be that sent by the correspondent 10.

In order for the system shown in FIG. 1 to operate it is necessary for the keys 20 to be identical and therefore a key agreement protocol is established that allows the transfer of information in a public manner to establish the identical keys. A number of protocols are available for such key generation and embodiments of the present invention will be described below in the context of modifications of existing protocol.

A commonly used net of protocols are collectively known as the Matsumoto-Takashima-Imai or "MTI" key agreement protocols, and are variants of the Diffie-Hellman key exchange. Their purpose is for parties A and B to establish a secret session key K.

The system parameters for these protocols are a prime number p and a generator $\alpha$ of the multiplicative group $Z_p^*$. Correspondent A has private key a and public key $p_A = \alpha^a$. Correspondent B has private key b and public key $p_B = \alpha^b$. In all four protocols exemplified below, $text_A$ refers to a string of information that identifies party A. If the other correspondent B possesses an authentic copy of correspondent A's public key, then $text_A$ will contain A's public-key certificate, issued by a trusted center; correspondent B can use his authentic copy of the trusted center's public key to verify correspondent A's certificate, hence obtaining an authentic copy of correspondent A's public key.

In each example below it is assumed that an interloper E wishes to have messages from A identified as having originated from E herself. To accomplish this, E selects a random integer e, $1 \leq e \leq p-2$, computes a public key $p_E = (p_A) \alpha^{ae}$ mod p, and gets this certified as her public key. E does not know the exponent ae, although she knows e. By substituting $text_E$ for $text_A$, the correspondent B will assume that the message originates from E rather than A and use E's public key to generate the session key K. E also intercepts the message from B and uses his secret random integer e to modify its contents. A will then use that information to generate the same session key allowing A to communicate with B.

The present invention is exemplified by modifications to 4 of the family of MTI protocols which foil this new attack thereby achieving the desired property of mutual implicit authentication. In the modified protocols exemplified below F(X,Y) denotes a cryptographic function applied to a string derived from x and y. Typically and as exemplified a hash function, such as the NIST "Secure Hash Algorithm"(SHA-1), is applied to the string obtained by concatenating X and Y but it will be understood that other cryptographic functions may be used.

EXAMPLE 1

MTI/A0 Protocol

The existing protocol operates as follows:

1. Correspondent A generates a random integer x, $1 \leq x \leq p-2$, computes $\alpha^x$, and sends $\{\alpha^x, text_A\}$ to party B.

2. Correspondent B generates a random integer y, $1 \leq y \leq p-2$, computes $\alpha^y$, and sends $\{\alpha^y, \text{text}_B\}$ to party A.

3. Correspondent A computes key $K=(\alpha^y)^a(p_B)^x=\alpha^{ay+bx}$.

4. Correspondent B computes key $K=(\alpha^x)^b(p_A)^y=\alpha^{ay+bx}$.

A common key K is thus obtained. However, with this arrangement, interloper E may have messages generated by correspondent A identified as having originated from E in the following manner.

1. E intercepts A's message $\{\alpha^x, \text{text}_A\}$ and replaces it with $\{\alpha^x, \text{text}_E\}$. The provision of the message $\text{text}_E$ identifies the message as having originated at E.

2. B sends $\{\alpha^y, \text{text}_B\}$ to E, who then forwards $\{(\alpha^y)^e, \text{text}_B\}$ to A. Since A receives $\text{text}_B$, he assumes the message originates at B and, as he does not know the value of y, assumes that $\alpha^{ye}$ is valid information.

3. A computes $K=(\alpha^{by})^a(p_B)^x=\alpha^{say+bx}$.

4. B computes $K=(\alpha^x)^b(p_E)^y=\alpha^{say+bx}$.

5. A and B now share the key K, even though B believes he shares a key with E.

Accordingly any further transactions from A to B will be considered by B to have originated at E. B will act accordingly crediting instruction to E. Even though the interloper E does not learn the value of the session key K nevertheless the assumption that the message originates at E may be valuable and achieve the desired effect.

Figure 2:
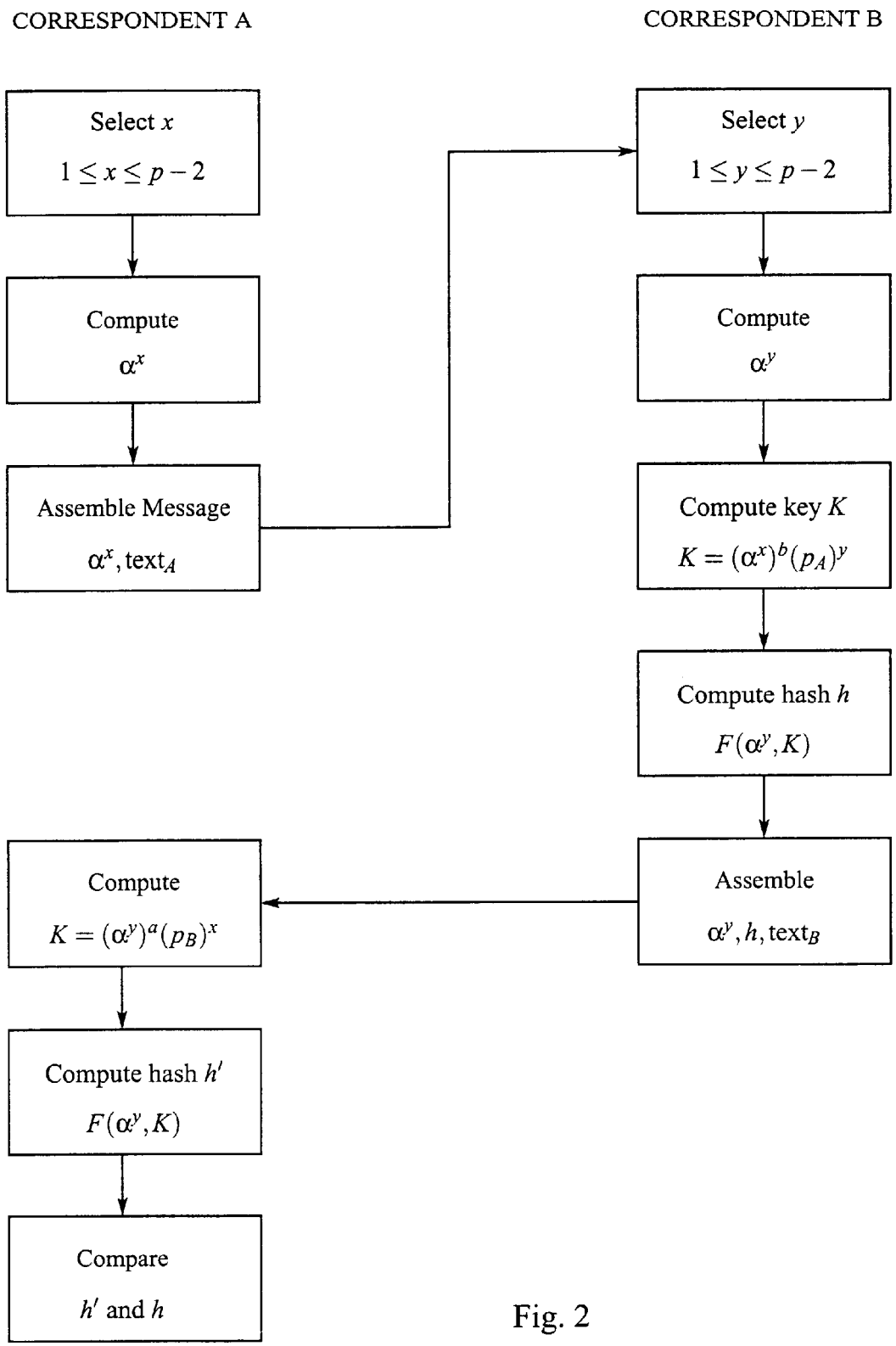
FIG. 2. is a schematic representation of the implementation of a key authentication protocol.

To avoid this problem, the protocol is modified as follows as shown schematically in FIG. 2:

1. A generates a random integer $x, 1 \leq x \leq p-2$, computes $\alpha^x$, and sends $\{\alpha^x, \text{text}_A\}$ to party B.

2. B generates a random integer $y, 1 \leq y \leq p-2$, and computes $\alpha^y$, $K=(\alpha^x)^b(p_A)^y=\alpha^{ay+bx}$, and a value h of cryptographic hash function $F(\alpha^y, \alpha^{ay+bx})$ which is a function of public information $\pi$ and the key K. B sends $\{\alpha^y, h, \text{text}_B\}$ to party A.

3. A computes $K=(\alpha^y)^a(p_b)^x=\alpha^{ay+bx}$. A also computes a value h' of cryptographic hash function $F(\alpha^y, K)$ and verifies that this value is equal to h.

If E attempts to interpose her identification, $\text{text}_E$, the attack fails on the modified protocols because in each cane B sends the hash value $F(\pi, K)$, where $\pi$ is B's random exponential, $\alpha^y$, thereby binding together the values of $\pi$ and K. E cannot subsequently replace the value of $\pi$ with $\pi^e$ and compute $F(\pi^e, K)$ since E does not know K. Even though E knows $\alpha^y$, this is not sufficient to extract K from the hash value h. Accordingly, oven it E interposes the value $\alpha^{ye}$ so that the keys 20 will agree, the values h, h' will not,

EXAMPLE 2

MTI/B0 Protocol

In this protocol,

1. A generates a random integer $x, 1 \leq x \leq p-2$, computes $(p_B)^x=\alpha^{bx}$, and sends $\{\alpha^{bx}, \text{text}_A\}$ to party B.

2. B generates a random integer $y, 1 \leq y \leq p-2$, computes $(p_A)^y=\alpha^{ay}$, and sends $\{\alpha^{ay}, \text{text}_B\}$ to party A.

3. A computes $K=(\alpha^{ay})^{a^{-1}}\alpha^x=\alpha^{x+y}$

4. A computes $K=(\alpha^{bx})^{b^{-1}}\alpha^y=\alpha^{x+y}$

This protocol is vulnerable to the interloper E if,

1. E replaces A's message $\{\alpha^{bx}, \text{text}_A\}$ with $\{\alpha^{bx}, \text{text}_E\}$ to identify herself as the originator to the message.

2. B sends $\{(p_E)^y, \text{text}_E\}$ to E, who then computes $((p_E)^y)^{e^{-1}}=\alpha^{ay}$ and forwards $\{\alpha^{ay}, \text{text}_E\}$ to A.

3. A computes $K=(\alpha^{ay})^{a^{-1}}\alpha^x=\alpha^{x+y}$

4. B computes $K=(\alpha^{bx})^{b^{-1}}\alpha^y=\alpha^{x+y}$

5. A and B now share the key K, even though B believes he shares a key with E.

This protocol may be modified to resist E's attack as follows.

1. A generates a random integer $x, 1 \leq x \leq p-2$, computes $(p_B)^x=\alpha^{bx}$, $\{(\alpha^{bx}, \text{text}_A\}$ to party B.

2. B generates a random integer $y, 1 \leq y \leq p-2$, and computes $(p_A)^y=\alpha^{ay}$, $K=(\alpha^{bx})^{b^{-1}}\alpha^y=\alpha^{x+y}$, and the value h of hash function $F(\alpha^{xy}, \alpha^{x+y})$. B sends $\{\alpha^{ay}h, \text{text}_B\}$ to A.

3. A compute $K=(\alpha^{ay})^{a^{-1}}\alpha^{x+y}$. A also computes the value h' of hash function $F(\alpha^{ay}, K)$ and verifies that this value is equal to h.

Once again, E cannot determine the session key K and so cannot generate a new value of the hash function to maintain the deception.

EXAMPLE 3

MTI/CO Protocol

This protocol operates as follows:

1. A generates a random integer $x, 1 \leq x \leq p-2$, computes $(p_B)^x=\alpha^{bx}$, and sends $\{\alpha^{bx}, \text{text}_A\}$ to party B.

2. B generates a random integer $y, 1 \leq y \leq p-2$, computes $(p_A)^y=\alpha^{ay}$, and sends, $\{\alpha^{ay}, \text{text}_B\}$ to party A.

3. A computes $K=(\alpha^{ay})^{a^{-1}x}=\alpha^{xy}$

4. B computes $K=(\alpha^{bx})^{b^{-1}y}=\alpha^{xy}$

The interloper E may interpose her identity as follows:

1. E replaces A's message $\{\alpha^{bx}, \text{text}_A\}$ with $\{\alpha^{bx}, \text{text}_E\}$.

2. B sends $\{(p_E)^y, \text{text}_E\}$ to E, who then computes $((p_E)^y)^{a^{-1}}=\alpha^{ay}$ and forwards $\{\alpha^{ay}, \text{text}_B\}$ to A.

3. A computes $K=(\alpha^{ay})^{a^{-1}x}=\alpha^{xy}$

4. B computes $K=(\alpha^{bx})^{b^{-1}y}=\alpha^{xy}$

5. A and B now share the key K, even though B believes he shares a key with E.

To avoid this attack protocol is modified as follows:

1. A generates a random integer $x, 1 \leq x \leq p-2$, computes $(p_B)^x-\alpha^{bx}$, and sends $\{\alpha^{bx}, \text{text}_A\}$ to party B.

2. B generates a random integer $y, 1 \leq y \leq p-2$, and computes $(p_A)^y=\alpha^{ay}$, $K=(\alpha^{bx})^{b^{-1}y}=\alpha^{xy}$, and value h of hash function $F(\alpha^{xy}, \alpha^{xy})$. B sends $\{\alpha^{ay}, h, \text{text}_B\}$ to party A.

3. A computes $K=(\alpha^{ay})^{a^{-1}x}=\alpha^{xy}$. A also computes the value h' of $F(\alpha^{ay}, K)$ and verifies that this value is equal to h.

EXAMPLE 4

MTI/C1 Protocol

In this protocol:

1. A generates a random integer $x, 1 \leq x \leq p-2$, computes $(p_B)^{ax}=\alpha^{abx}$, and sends $\{\alpha^{abx}, \text{text}_A\}$ to party B.

2. B generates a random integer $y, 1 \leq y \leq p-2$, computes $(p_A)^{by}=\alpha^{aby}$, and sends $\{\alpha^{aby}, \text{text}_B\}$ to party A.

3. A computes $K=(\alpha^{aby})^x=\alpha^{abxy}$.

4. B computes $K=(\alpha^{abx})^y=\alpha^{abxy}$.

E can act as an interloper an follows:

1. E replaces A's message $\{\alpha^{abx}, \text{text}_A\}$ with $\{\alpha^{abx}, \text{text}_E\}$.

2. B sends $\{(p_E)^{by}, \text{text}_B\}$ to E, who then computes $((p_E)^{by})^{e^{-1}}=\alpha^{aby}$ and forwards $\{\alpha^{aby}, \text{text}_B\}$ to A.

3. A computes $K=(\alpha^{aby})^x=\alpha^{abxy}$.

4. B computes $K=(\alpha^{abx})^y=\alpha^{abxy}$.

5. A and B now share the key K, even though B believes he shares a key with E.

To avoid this, the protocol is modified an follows:

1. A generates a random integer $x, 1 \leq x \leq p-2$, computes $(p_B)^{ax}=\alpha^{abx}$, and sends $\{\alpha^{abx}, \text{text}_A\}$ to party B.

2. B generates a random integer $y, 1 \leq y \leq p-2$, and computes $(p_A)^{by}=\alpha^{aby}, K=(\alpha^{abx})^y=\alpha^{abxy}$, and $h=F(\alpha^{aby}, \alpha^{abxy})$. B sends $\{\alpha^{aby}, h, \text{text}_B\}$ to party A.

3. A computes $K=(\alpha^{aby})^x=\alpha^{abxy}$. A also computes $h'=F(\alpha^{aby},K)$ and verifies that this value is equal to h.

In each of the modified protocols discussed above, key confirmation from B to A is provided.

As noted above instead of F being a cryptographic hash function other functions could be used. For example, an option available is to choose $F=\epsilon_k$, where $\epsilon$ is the encryption function of a suitable symmetric-key encryption scheme, and K is the session key established. Because E cannot generate the session key K, it is similarly not able to generate the value of the function F and therefore cannot interpose for the correspondent A.

The technique described above can be applied to other similar key exchange protocols, including all of the 3 infinite classes of MTI protocols called MTI-A(k), MTI-B(k) and MTI-C (k).

The Goes authenticated key exchange protocol is similar to the MTI/A0 protocol, except that the session key is the bitwise exclusive-OR of $\alpha^{ay}$ and $\alpha^{bx}$; that is $K=\alpha^{ay} \oplus \alpha^{bx}$ instead of being the product of $\alpha^{ay}$ and $\alpha^{bx}$. Hence the attack on the MTI/A0 protocol and its modification can be extended in a straightforward manner to the case of the Goss protocol.

Similarly Yacobi's authenticated key exchange protocol is exactly the same as the MTI/A0 protocol, except that $\alpha$ is an element of the group of units $Z_n^e$, where n in the product of 2 large primes. Again, the attack on the MTI/A0 protocol and its modification can be extended in a straightforward manner to the case of the Goss protocol.

A further way of foiling the interposition of E is to require that each entity prove to a trusted center that it knows the exponent of $\alpha$ that produces its public key P, before the center issues a certificate for the public key. Because E only knows "e" and not "ae" it would not meet this requirement. This can be achieved through zero knowledge techniques to protect the secrecy of the private keys but also requires the availability of a trusted centre which may not be convenient.

Each of the above examples has been described with a 2 pass protocol for key authentication. One pass protocols also exist to establish a key between correspondents and may be similarly vulnerable.

As an example the Nyberg-Rueppel one pass key agreement protocol will be described and a modification proposed.

The purpose of this protocol is for party A and party B to agree upon a secret session key K.

The system parameters for these protocols are a prime numb p and a generator $\alpha$ of the multiplicative group $Z_p^e$. User A has private key a and public key $p_A=\alpha^a$. User B has private key b and public key $p_B=\alpha^b$.

1. A selects random integers x and t, $1 \leq x, t \leq p-2$.
2. A computes $r=(p_B)^t \alpha^{-x}$ mod p and $s=x-ra$ mod (p-1), and sends $\{r, s, \text{text}_A\}$ to B.
3. B recovers the value $\alpha^x$ mod p by computing $\alpha^s(p_A)^r$ mod p- and then computes the shared session key $K=(r\alpha^x)^{b^{-1}}=\alpha^t$ mod p.

If interloper E wishes to have messages from A identified as having originated from herself, E selects a random integer e, $1 \leq e \leq p-2$, computes $p_E=\alpha^e$, and gets this certified as her public key.

1. E interCepts A's message $\{r, s, \text{text}_A\}$ and computes $\alpha^x=\alpha^s(p_A)^r$ and $\alpha^{bt}=r\alpha^x$.
2. E then selects a random integer x', $1 \leq x' \leq p-2$, computes $r'=\alpha^{bt}\alpha^{-x'}$ mod p and $s'=x'-r'e$ mod (p-1).
3. E sends $\{r', s', \text{text}_E\}$ to B.
4. B recovers the value $\alpha^{k}$ mod p by computing $\alpha^{s'}(p_E)^{r'}$ mod p and then computes $K=(r'\alpha^{x'})^{b^{-1}}=\alpha^t$ mod p.

5. A and B now share the key K, even though B believes he shares a key with E.

Figure 3:
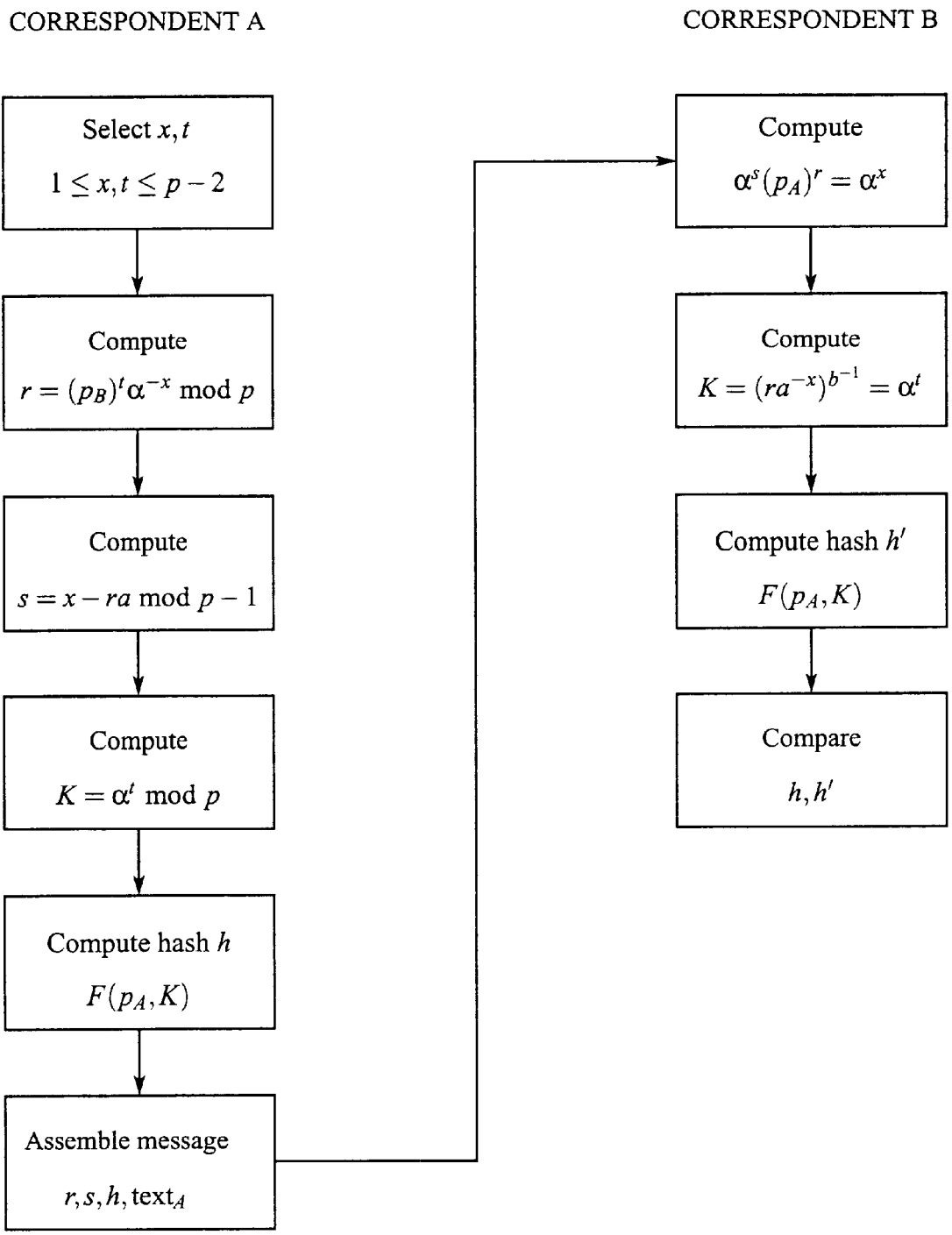
FIG. 3. is a schematic representation of the implementation of a key transport protocol.

To foil such an attack the protocol is modified by requiring A to also transmit a value h of $F(p_A,K)$, where F is a hash function, an encryption function of a symmetric-key system with key K or other suitable cryptographic function. The modified protocol is the following as shown schematically in FIG. 3.

1. A selects random integers x and t, $1 \leq x, t \leq p-2$.
2. A computes $r=(p_B)^t \alpha^{-x}$ mod p, $a-x-ra$ mod (p-1), session key $K=\alpha^t$ mod p and the value h of hash function $F(p_A,K)$. A sends $\{r, s, h, \text{text}_A\}$ to B.
3. B recovers the value $\alpha^x$ mod p by computing $\alpha^s(p_A)^r$ mod p and then computes the shared session key $K-(r\alpha^x)^{b^{-1}}=\alpha^t$ mod p. B also computes the value h' of function $F(p_A,K)$ and verifies that this value is equal to h.

Again therefore by binding together the public information $\pi$ and the session key K in the hash function, the interposition of E will not result in identical hash functions h,h'.

In each case it can be seen that a relatively simple modification to the protocols involving the binding of public and private information in a cryptographic function foils the interposition of interloper E.

All the protocols discussed above have bean described in the setting of the multiplicative group $Z_p^e$. However, they can all be easily modified to work in any finite group in which the discrete logarithm problem appears intractable. Suitable choices include the multiplicative group of a finite field (in particular the finite. field $GF(2^z)$, subgroups of $Z_p^e$ of order q, and the group of points on an elliptic curve defined over a finite field. In each case an appropriate generator a will be used to define the public keys.

The protocols discussed above can also be modified in a straightforward way to handle the situation when each user picks their own system parameters p and $\alpha$ (or analogous parameters if a group other than $Z_p^e$ is used).

We claim:

1. A method of authenticating a pair of correspondents A, B in a public key data communication system to permit exchange of information therebetween over a communication channel, each of said correspondents having a respective private key a, b and a public key $p_A$, $p_B$ derived from a generator $\alpha$ and respective ones of said private keys a, b, said method including the steps of:

i) a first of said correspondents A selecting a first random integer x and exponentiating a first function $f(\alpha)$ including said generator to a power $g(x)$ to provide a first exponentiated function $f(\alpha)^{g(x)}$;

ii) said first correspondent A forwarding to a second correspondent B a message including said first exponentiated function $f(\alpha)^{g(x)}$;

iii) said correspondent B selecting a second random integer y and exponentiating a second function $f'(\alpha)$ including said generator to a power $g(y)$ to provide a second exponentiated function $f'(\alpha)^{g(y)}$;

iv) said second correspondent B constructing a session key K from information made public by said first correspondent A including said public key $p_A$, and information that is private to said second correspondent B, said session key K also being constructible by said first correspondent A from information made public by said second correspondent B including said public key $p_B$, and information that is private to said first correspondent A;

v) said second correspondent B generating a value h of a function F[π, K] where F[π, K] denotes a cryptographic function F applied conjointly to π and K to bind the values of π to K and where π is obtained from said information made public by said second correspondent B to permit construction of said session key K;

vi) said second of said correspondents B forwarding a message to said first correspondent A including said second exponentiated function $f(\alpha)^{g(y)}$ and said value h of said cryptographic function F[π, K];

vii) said first correspondent receiving said message and computing a session key K' from said information made public by said second correspondent B and private to said first correspondent A;

viii) said first correspondent A computing a value h' by application of a cryptographic function F to π and K'; and ix) comparing said values obtained from said application of said cryptographic functions F to confirm their correspondence.

2. A method of claim 1 wherein said message forwarded by said first correspondent includes an to identification of the first correspondent.

3. A method according to claim 1 wherein said message forwarded by said second correspondent includes an identification of said second correspondent.

4. A method according to claim 3 wherein said message forwarded by said first correspondent includes an identification of the first correspondent.

5. A method according to claim 1 wherein said first function f(α) including said generator is said generator itself.

6. A method according to claim 1 wherein said second function f'(α) including said generator is said generator itself.

7. A method according to claim 6 wherein said first function f(α) including said generator is said generator itself.

8. A method according to claim 1 wherein said first function f(α) including said generator includes said public key $p_B$ of said second correspondent.

9. A method according to claim 1 wherein said second function [f'α] f'(α) including said generator [f'α] includes said public key $p_A$ of said first correspondent.

10. A method according to claim 1 wherein each of said cryptographic functions F are identical hash functions applied to a and said session key K, K' [hashes of π and K].

11. A method of transporting a key between a pair of correspondents A, B in a public key data communication system to permit exchange of information therebetween over a communication channel, each of said correspondents having a respective private key a, b and a public key $p_A$, $p_B$ derived from a generator α and respective ones of said private keys a, b, said method including the steps of:

i) a first of said correspondents A selecting a first random integer x and exponentiating a function f(α) including said generator to a power g(x) to provide a first exponentiated function $f(\alpha)^{g(x)}$;

ii) said first correspondent A forwarding to a second correspondent B a message including said first exponentiated function $f(\alpha)^{g(x)}$;

iii) said second correspondent B constructing a session key K from information made public by said first correspondent A including said public key $p_A$, and information that is private to said second correspondent B, said session key K also being constructible by said first correspondent A from information made public by said second correspondent B including said public key $p_B$, and information that is private to said first correspondent A;

iv) both of said first correspondent A and said second correspondent B computing a respective value h, h' of function F[π, K] where F [π, K] denotes a cryptographic function applied to π and K thereby to bind the values of π and K where π is obtained from said information made public by one of said correspondents to permit construction of said session key K; and v) at least one of said correspondents comparing said values h, h' obtained from said cryptographic function F to confirm their correspondence.

12. A method of claim 11 wherein said message forwarded by said first correspondent includes an identification of the first correspondent.

13. A method according to claim 11 wherein said message forwarded by said first correspondent includes said value obtained from said function F(π,K) by said first correspondent.

14. A method according to claim 11 wherein said respective values h, h' obtained from application of said functions F[π,K] are obtained from the application of an identical function to a hash of said public information provided by said one correspondent and said session key K.

15. A method according to claim 1 wherein each of said cryptographic functions F applied by each of said correspondents is identical.

16. A method according to claim 11 wherein each of said cryptographic functions F applied by each of said correspondents is identical.

* * * * *